United States Patent Office 3,480,640
Patented Nov. 25, 1969

3,480,640
CERTAIN PHENOXY OXAZOLIDINE DERIVATIVES
Max Wilhelm, Allschwil, Switzerland, Hans Ulrich Daeniker, Clifton, N.J., and Karl Schenker, Binningen, and Paul Schmidt, Therwil, Switzerland, assignors to Ciba Corporation, New York, N.Y., a corporation of Delaware
No Drawing. Continuation-in-part of application Ser. No. 554,309, June 1, 1966. This application Apr. 5, 1967, Ser. No. 628,520
Claims priority, application Switzerland, July 9, 1965, 9,629/65
Int. Cl. C07d *85/26, 31/42;* A61k *27/00*
U.S. Cl. 260—296                                    10 Claims

ABSTRACT OF THE DISCLOSURE

The invention concerns compounds of the formula

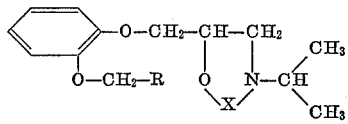

in which R is a lower alkenyl radical containing at least 2 and preferably not more than 4 carbon atoms and X represents an alkylidene group, which compounds are useful as adrenergic β-receptor blockers.

---

This application is a continuation in part application of our application Ser. No. 554,309, filed June 1, 1966, now abandoned.

The present invention relates to new oxazolidines and their salts. Especially it concerns compounds of the formula I
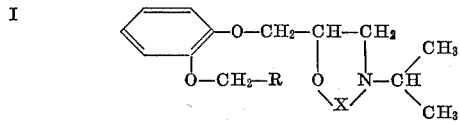

where R represents a lower alkenyl radical which contains at least 2 and preferably at most 4 carbon atoms, and X represents an alkylidene group.

The residue R is preferably the vinyl radical or a propenyl or butenyl radical.

The alkylidene group X is more especially a lower alkylidene group such as an ethylidene, n-propylidene, isopropylidene, or a linear or branched butylidene or pentylidene group which may be linked in any desired position, or above all the methylidene group. The alkylidene group, especially the methylidene group, may carry one or several substituents, these substituents being cycloaliphatic or preferably residues of aromatic character.

Suitable residues of aromatic character are above all mononuclear residues, above all phenyl residues or heterocyclic residues of aromatic character. Heterocyclic residues of aromatic character are, for example, furyl, thienyl, pyrryl or above all pyridyl residues. The residues of aromatic character may be unsubstituted or carry one, two or more substituents, above all halogen atoms, alkyl or alkoxy groups or trifluoromethyl groups. Cycloaliphatic residues are in the first place cyclopentyl and cyclohexyl residues.

Halogen atoms are above all chlorine, bromine or iodine atoms, alkyl groups, above all lower alkyl groups such as methyl, ethyl, n-propyl or isopropyl groups, linear or branched butyl or pentyl groups which may be linked in any desired position. Alkoxy groups are especially lower alkoxy groups, such as methoxy, ethoxy, n-propoxy, isopropoxy or butoxy groups.

The new compounds possess valuable pharmacological properties. Inter alia, more especially they inhibit adrenergic β-receptors as has been demonstrated in animal tests, for example on cats and on isolated guinea pig hearts. The new compounds may therefore be used for treating Angina peccoris or a disturbed cardial rhythm. The new compounds are also valuable intermediates for the manufacture of other useful substances, especially of pharmacologically active substances.

Particularly valuable pharmacological properties are found in compounds of the formula

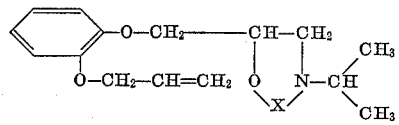

where X represents an alkylidene group, and above all in 2 - (4 - pyridyl) - 3 - isopropyl - 5 - (ortho-allyloxy - phenoxymethyl) - oxazolidine and 2 - (para-chlorophenyl) - 3 - isopropyl - 5 - (orthoallyloxy - phenoxymethyl) -oxazolidine and primarily in 2-phenyl-3-isopropyl-5-(ortho-allyloxy-phenoxymethyl)-oxazolidine of the formula II
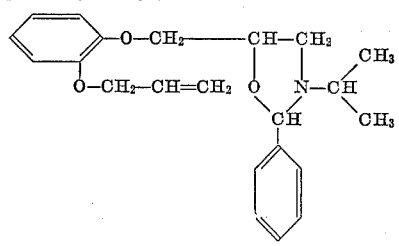

which, for example when administered intravenously to cats in a dose of 0.01 to 0.1 mg. per kg. bodyweight displays a distinct β-blocking effect.

The new compounds are manufactured by known methods.

Advantageously, a compound of the formula

III
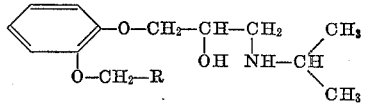

where R has the above meaning, is reacted with a compound of the formula X=O, where X has the above meaning, or with a reactive carbonyl derivative thereof.

Reactive carbonyl derivatives are above all acetals, ketals, thioketals, especially dimethyl- or diethylacetals or -ketals, or acylals, especially those with acetic acid or with hydrohalic acids, for example compounds of the formual $XCl_2$ or $XBr_2$, where X has the above meaning. The reaction is carried out in the usual manner, in the presence or absence of solvents, at room temperature or preferably at an elevated temperature, if necessary with addition of a condensing agent, especially an acid condensing agent.

The starting materials are known or can be obtained by known methods.

Depending on the reaction conditions and starting materials used the final compounds and starting materials used the final compounds are obtained in the free form or in the form of their salts which are likewise included in the present invention. The salts of the final compounds can be converted into the free bases in known manner, for example with alkalies or ion exchange resins. The free bases yield salts on reaction with organic or inorganic acids, especially those which are suitable for forming therapeutically acceptable salts, such acids are, for example, as hydrohalic, sulphuric, phosphoric acids, nitric or perchloric acid; aliphatic, alicyclic, aromatic or heterocyclic carboxylic or sulphonic acids, such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicyclic, para-aminosalicylic, embonic, methanesulphonic, ethanesulphonic, hydroxyethanesulphonic, ethylenesulphonic acid; halobenzenesulphonic, toluenesulphonic, naphthalenesulphonic acids or sulphanilic acid; methionine, tryptophan, lysine or arginine.

These or other salts of the new compounds, for example their picrates, may also be used for purifying the free bases obtained by converting the latter into salts, isolating the salts and liberating the free bases from them. In view of the close relationship between the new compounds in the free form and in the form of their salts, what has been said above with reference to the free bases concerns also the corresponding salts wherever this is possible and expedient.

The invention further includes any variant of the present process in which an intermediate obtained at any stage of the process is used as starting material and any remaining step/steps is/are carried out or the process is discontinued at any stage thereof, or in which the starting materials are formed under the reaction conditions or the reactants may be used in the form of their salts.

The new compounds may be present as racemates, possibly as mixtures of racemates or in the form of their antipodes. Racemate mixtures can be resolved into the diastereoisomeric racemates and racemates into the antipodes in the usual manner. It is advantageous to isolate the more active antipode.

The new compounds may be used, for example, in the form of pharmaceutical preparations containing them or their salts in conjunction or admixture with an organic or inorganic, solid or liquid pharmaceutical excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneeglycols, white petroleum jelly or other known medicinal excipients. The pharmaceutical preparations may be, for example, tablets, dragees or capsules, or in liquid form solutions, suspensions or emulsions. They may be sterilized and/or contain auxiliaries such as preserving, stabilizing, wetting or emulsifying agents, solution promoters or salts for regulating the osmotic pressure or buffers. They may also contain other therapeutically valuable substances. The pharmaceutical preparations are formulated by known methods.

The following examples illustrate the invention.

EXAMPLE 1

A solution of 13.0 g. of 1-isopropylamino-2-hydroxy-3-(ortho-allyloxy-phenoxy)-propane and 6.0 g. of benzaldehyde in 150 ml. of benzene is boiled for 6 hours with the use of a water separator, and the benzene is then distilled off and the residue is distilled under a high vacuum, to yield 2-phenyl-3-isopropyl-5-(ortho-allyloxyphenoxymethyl)-oxazolidine of the formula

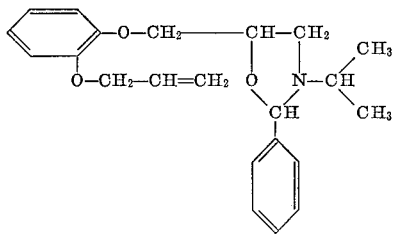

boiling at 175 to 180° C. under 0.1 mm. Hg pressure.

The starting material is obtained in the following manner:

A mixture of 75 g. of pyrocatechol monoallyl ether, 75 g. of epichlorohydrin, 75 g. of potassium carbonate and 400 ml. of acetone is stirred for 12 hours at the boil, and the potassium carbonate is then filtered off. The solvent is distilled off under a water-jet vacuum, to leave an oil which is dissolved in ether and agitated with 2 N-sodium hydroxide solution. The ether is separated, dried and distilled off, and the residue thus obtained is distilled under a water-jet vacuum. 3-(ortho-allyloxy-phenoxy)-1,2-epoxypropane passes over between 145 and 157° C. under 11 mm. Hg pressure.

A solution of 15 g. of 3-(ortho-allyloxy-phenoxy)-1,2-epoxypropane and 15 g. of isopropylamine in 20 ml. of ethanol is refluxed for 4 hours. The excess amine and the alcohol are then distilled off under vacuum, to leave 1-isopropylamino-2-hydroxy-3-(ortho-allyloxy-phenoxy)-propane which melts at 75 to 80° C. after recrystallization from hexane.

EXAMPLE 2

A solution of 13.0 g. of 1-isopropylamino-2-hydroxy-3-(ortho-allyloxy-phenoxy)-propane and 8.0 g. of 4-pyridine aldehyde in 100 ml. of benzene is boiled for 8 hours with the use of a water separator. The benzene is then distilled off under atmospheric pressure and the residue fractionated under a high vacuum. 2-(4-pyridyl)-3-isopropyl - 5 - (ortho-allyloxy-phenoxymethyl) - oxazolidine of the formula

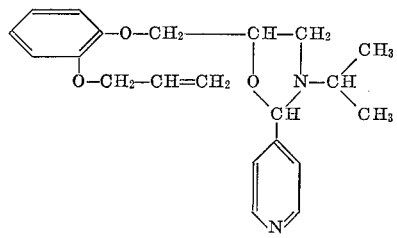

passes over between 205 and 210° C. under 0.07 mm. Hg pressure.

EXAMPLE 3

A solution of 13.0 g. of 1-isopropylamino-2-hydroxy-3-(ortho-allyloxy-phenoxy)-propane and 8.0 g. of para-chlorobenzaldehyde in 150 ml. of benzene is boiled for 6 hours using a water separator. The benzene is then distilled off under atmospheric pressure. The residue is distilled under a high vacuum. There is obtained 2-(para-chlorophenyl) - 3 - isopropyl - 5 - (ortho-allyloxy-phenoxymethyl)-oxazolidine of the formula

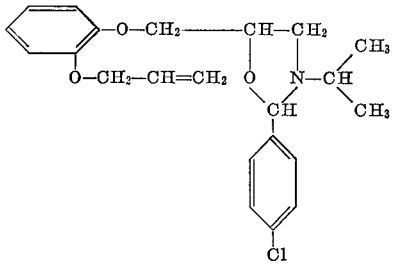

in the form of an oil which boils at 195–205° C. under a pressure of 0.1 mm. of Hg.

EXAMPLE 4

For filling capsules the following mixture is used:

| | Mg. |
|---|---|
| 2 - phenyl - 3 - isopropyl-5-(ortho-allyloxy-phenoxymethyl)-oxazolidine | 20 |
| Polyethyleneglycol (molecular weight: 400) | 105 |

The active substance is mixed with polyethyleneglycol and portions of 125 mg. each of the mixture are filled into soft gelatin capsules.

EXAMPLE 5

The new compounds may be used in the form of pharmaceutical preparations containing them in conjunction or admixture with vasodilatory compounds, especially coronary dilatory compounds above all vasodilatory esters of nitrous or nitric acid, in the first place nitroglycerin, pentaerythritol tetranitrate, triethanolamine trinitrate, nitromannitol, also theobromine, theophilline, hydroxyethyl-theophilline, dihydroxypropyl theophilline and other coronarydilatory derivatives of theobromine and theophilline, as well as 2-ethyl-3-(3',5-diiodo-4'-hydroxybenzoyl)-benzofuran, 2,6-bis(diethanolamino)-4,8-dipiperidinopyrimido[5,4-d]pyrimidine and N-3'-phenylpropyl(2') - 1,1-diphenylpropyl-(3)-amino or adenosine.

Soft gelatin capsules are formulated, for example, so that the daily dose amounts to 20 to 500 mg. of 2-phenyl-3 - isopropyl - 5-(ortho-allyloxy-phenoxymethyl)-oxazolidine and 5 to 50 mg. of pentaerythritol tetranitrate, the administration being advantageously made three times daily.

EXAMPLE 6

20 g. of 1-isopropylamino-2-hydroxy-3-(ortho-allyloxyphenoxy)-propane are refluxed for 2 hours with 10 g. of paraformaldehyde in 150 ml. of benzene. Undissolved matter is then filtered off and the residue evaporated under a pressure of 12 mm. Hg. The oil which remains is distilled under a high vacuum. 3-isopropyl-5-(ortho-allyloxy-phenoxymethyl)-oxazolidine of the formula

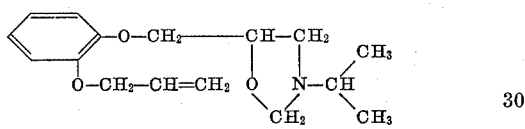

is obtained as a colorless oil which boils at 146–149° C. under a pressure of 0.1 mm. Hg.

What is claimed is:

1. A member selected from the group consisting of an oxazolidine compound of the formula

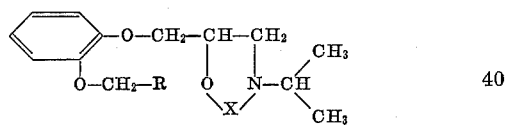

in which R represents a lower alkenyl radical which contains 2 to 4 carbon atoms and X represents a lower alkylidene group, and therapeutically acceptable acid salts thereof.

2. A compound as claimed in claim 1, in which X represents methylidene.

3. A compound as claimed in claim 1, in which R represents the vinyl radical.

4. A compound as claimed in claim 1, in which X represents a lower alkylidene group substituted by a cyclopentyl or cyclohexyl radical.

5. A compound as claimed in claim 1, in which X represents a lower alkylidene group substituted by a member selected from the group consisting of phenyl, furyl, thienyl, pyrryl or pyridyl and said phenyl, furyl, theinyl, pyrryl or pyridyl substituted by a member selected from the group consisting of halogen, trifluoromethyl, lower alkyl or lower alkoxy.

6. A compound as claimed in claim 1, in which X represents a lower alkylidene group substituted by a member selected from the group consisting of phenyl, halogenophenyl, alkylphenyl, lower alkoxyphenyl and trifluoromethylphenyl.

7. A compound as claimed in claim 1, that compound being 2 - phenyl - 3-isopropyl-5-(ortho-allyloxy-phenoxymethyl)oxazolidine of the formula

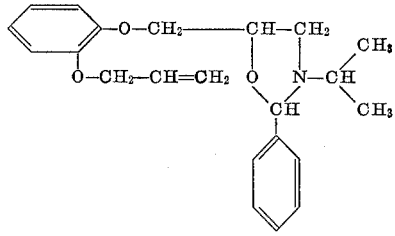

8. A compound as claimed in claim 1, that compound being 2 - (4-pyridyl)-3-isopropyl-5-(ortho-allyloxy-phenoxymethyl)-oxazolidine of the formula

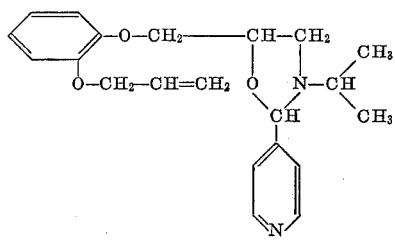

9. A compound as claimed in claim 1, that compound being 2 - (para-chlorophenyl)-3-isopropyl-5-(ortho-allyloxy-phenoxymethyl)-oxazolidine.

10. A compound as claimed in claim 1, said compound being 3-isopropyl-5-(o-allyloxy-phenoxymethyl)-oxazolidine of the formula

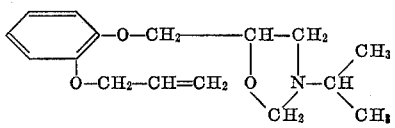

References Cited

UNITED STATES PATENTS 3,317,553   5/1967   Crowther et al. _____ 260—307

HENRY R. JILES, Primary Examiner

ALAN L. ROTMAN, Assistant Examiner

U.S. Cl. X.R.

260—294.8, 295, 307; 424—263, 266, 272